United States Patent Office 2,992,215
Patented July 11, 1961

2,992,215
ION EXCHANGE STARCHES WHICH RETAIN THEIR ORIGINAL GRANULAR FORM AND PROCESS FOR MAKING SAME
Austin L. Bullock and John D. Guthrie, New Orleans, La., assignors to the United States of America as represented by the Secretary of Agriculture
No Drawing. Filed May 24, 1960, Ser. No. 31,492
2 Claims. (Cl. 260—233.3)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to improved starch products having ion exchange properties and to processes for making them, while retaining the original granular structure of native starch.

One of the barriers to making certain ion exchange starches of relatively high ion exchange capacity is that starch readily dissolves or disperses in the reagents required for attaching the desired ionic group to the starch molecule. Thus, when certain processes suitable for chemically modifying cellulose to introduce ionic groups are applied to granular starch, the starch disperses or dissolves under the conditions required for chemical modification. Although the starch may become chemically modified, it loses its original granular structure and becomes a polyelectrolyte rather than an insoluble, non-dispersing, ion exchange material suitable for use in chromatographic columns in the separation of chemical substances, especially those of biochemical significance.

We have discovered that prior crosslinking of the starch by a process that does not destroy its original granular structure, permits it to be chemically modified by reagents and under conditions that would produce a non-granular, dispersed material when applied to granular starch that was not crosslinked. The invention thus provides chemically modified starch products having ion exchange uses and which retain the original granular structure desired for use in ion exchange chromatographic separation of chemical compounds. The starch products provided have the further advantage of retaining their granular structure in cold aqueous solutions of dilute acids or bases, or in boiling water, which makes them particularly suitable for certain chemical uses.

The preferred way of practicing the invention consists of crosslinking the native, granular starch with formaldehyde, followed by carboxymethylation, or by the attachment of 2(diethylamino) ethyl groups by ether linkage or by other suitable methods of attaching ionic groups to the starch molecules. The formaldehyde is conveniently provided by paraformaldehyde, which is converted to formaldehyde under the conditions of processing. Free formaldehyde or other sources of formaldehyde could also be used. The native, granular starch is reacted with 2 to 3 percent by weight of formaldehyde in acetone that has been acidified to about pH 2 with a trace of hydrochloric acid. Other acids could be used. The starch is refluxed with the acidified mixture of formaldehyde and acetone for 2 to 5 hours, after which it is separated and then etherified with either monochloroacetic acid or 2-chlorotriethyl amine by processes similar to those used for the etherification of cellulose by these reagents. Inasmuch as 20 to 40 percent by weight aqueous solutions of sodium hydroxide is used in etherifications with these or similar compounds, the advantage of using crosslinked starch is readily apparent, inasmuch as ordinary native, granular starch gels and disperses in aqueous sodium hydroxide solutions.

The invention is further illustrated by the following examples:

Example 1

Granular, native starch was crosslinked by suspending 50 parts of the starch and 3 parts of paraformaldehyde in about 200 parts of acetone containing enough dilute hydrochloric acid to give an apparent pH of about 2 and refluxing the mixture for 5 hours with constant stirring. The crosslinked starch was then removed by filtration, washed free of formaldehyde with hot water and dried. Ten parts of the starch, crosslinked as described above, was carboxymethylated by suspending it in a solution containing 17.5 parts of monochloroacetic acid in 10 parts of water, and pouring the mixture slowly with stirring into 100 parts of a 40% sodium hydroxide solution. After cooling the crosslinked carboxymethylated starch was then removed by filtration, washed with water then with acetone and dried. The product retained its granular structure in both water and in dilute sodium hydroxide solution and was useful as an ion-exchange material, having an ion exchange value of 1.33 milli-equivalents per gram.

A sample of the original starch lost its granular structure when carboxymethylated in the same manner, forming a very viscous solution which could not be filtered.

Example 2

Granular native starch was crosslinked with formaldehyde by the process of Example 1. Six parts of the crosslinked starch was mixed with 3.5 parts of 2-chlorotriethylamine hydrochloride in 4.5 parts of water. Then 17 ml. of 20% sodium hydroxide was added with thorough mixing. The mixture was then heated in an oil bath held at about 80° C. for 10 minutes. After removal from the oil bath, 50 ml. of 2 molar sodium chloride was added and the product filtered. The product was washed several times with 1 normal NaOH, then with water, 1 N HCl, water, 1 N NaOH and finally with water until the washings were neutral. The water remaining after filtration was removed by washing with 95% ethanol then with absolute ethanol and finally with ether. The sample was then dried under vacuum. The product contained 0.37% nitrogen and when packed in a column was an effective ion exchange material.

When the time of heating in the above procedure was increased to 30 minutes, the product had a trace of brown color and contained 1.06% nitrogen.

We claim:
1. A granular anion exchange material comprising starch in which the polymeric anhydroglucose chains of adjacent starch molecules are linked by methylene groups and in which starch 2-(diethylamino) ethyl groups are attached by ether linkage.

2. A process for making a granular anion exchange material which comprises refluxing native granular starch for from 2 to 5 hours with a solution of 2 to 3 percent by weight of formaldehyde in acetone acidified to about pH 2 with mineral acid, washing the refluxed starch free from formaldehyde with water, drying the washed starch, suspending the dried starch in an aqueous solution of 2-chlorotriethylamine hydrochloride, mixing the suspended starch with a 20 to 40 percent by weight aqueous solution of sodium hydroxide, heating at about 80° C. for 10 to 30 minutes, and then washing and drying the starch.

References Cited in the file of this patent
UNITED STATES PATENTS

| | | |
|---|---|---|
| 2,813,093 | Caldwell et al. | Nov. 12, 1957 |
| 2,853,484 | Lolkema et al. | Sept. 23, 1958 |
| 2,876,217 | Paschall | Mar. 3, 1959 |